(12) United States Patent
Hammond et al.

(10) Patent No.: US 6,965,044 B1
(45) Date of Patent: Nov. 15, 2005

(54) METHOD OF CONVERTING FREE FATTY ACIDS TO FATTY ACID METHYL ESTERS WITH SMALL EXCESS OF METHANOL

(75) Inventors: Earl G. Hammond, Ames, IA (US); Tong Wang, Ames, IA (US)

(73) Assignee: Iowa State University Research Foundation, Ames, IA (US)

( * ) Notice: Subject to any disclaimer, the term of this patent is extended or adjusted under 35 U.S.C. 154(b) by 0 days.

(21) Appl. No.: 10/190,771

(22) Filed: Jul. 5, 2002

Related U.S. Application Data

(60) Provisional application No. 60/303,656, filed on Jul. 6, 2001.

(51) Int. Cl.[7] .................................................. C11C 3/00
(52) U.S. Cl. ...................................... 554/169; 554/167
(58) Field of Search ................................. 554/156, 167, 554/169

(56) References Cited

U.S. PATENT DOCUMENTS

| | | | |
|---|---|---|---|
| 2,290,609 A | 7/1942 | Gross et al. | |
| 2,383,601 A | 8/1945 | Keim | |
| 4,164,506 A | 8/1979 | Kawahara et al. | |
| 4,303,590 A | 12/1981 | Tanaka et al. | |
| 4,608,202 A * | 8/1986 | Lepper et al. | ........... 260/410.9 |
| 4,652,406 A | 3/1987 | Lepper et al. | |
| 4,668,439 A | 5/1987 | Billenstein et al. | |
| 4,695,411 A | 9/1987 | Stern et al. | |
| 4,698,186 A | 10/1987 | Jeromin et al. | |
| 5,399,731 A | 3/1995 | Wimmer | |
| 5,424,466 A | 6/1995 | Stern et al. | |
| 5,424,467 A | 6/1995 | Bam et al. | |
| 5,495,033 A | 2/1996 | Basu et al. | |
| 5,525,126 A | 6/1996 | Basu et al. | |
| 5,972,057 A | 10/1999 | Hayafuji et al. | |
| 2003/0158074 A1 * | 8/2003 | Hass et al. | ................... 554/156 |

OTHER PUBLICATIONS

Boocock, D.G.B., S.K. Konar, V.M.C. Lee, and S. Buligan, Fast Formation of High-Purity Methyl Esters from Vegetable Oils, J. Am. Oil Chem. Soc. 75: 1167-1172 (1998).

(Continued)

*Primary Examiner*—Deborah D. Carr
(74) *Attorney, Agent, or Firm*—Quarles & Brady LLP

(57) ABSTRACT

A method for converting free fatty acids in acid oil or acid fat into fatty acid methyl esters is disclosed. The method involves adding a small amount of methanol and an acid catalyst to the acid oil or acid fat and subjecting the mixture to conditions that allow the fatty acid methyl esters to form. A lipid phase containing the fatty acid methyl esters and triglycerides can from and be separated from the rest of the reaction mixture. The lipid phase can then be subjected to conditions suitable for converting the triglycerides into fatty acid methyl esters. The method of present invention is especially useful for a process of generating biodiesel using a starting material of vegetable and animal oils and fats that contain a relatively high level of free fatty acids.

46 Claims, 4 Drawing Sheets

OTHER PUBLICATIONS

Freeman, B., E.H. Pryde, and T.L. Mounts, Variables Affecting the Yields of Fatty Esters from Transesterified Vegetable Oils, J. Am. Oil Chem. Soc. 61: 1638-1643 (1984).

Freeman, B., R.O. Butterfield, and E.H. Pryde, Transesterification Kinetics of Soybean Oil, J. Am. Oil Chem. Soc. 63: 1375-1380 (1986).

Haas, M.J., S. Bloomer, and K. Scott, Simple, High-Efficiency Synthesis Method of Fatty Acid Methy Esters from Soapstock, J. Am. Oil Chem. Soc. 77: 373-379 (2000).

Haas, M.J. and K.M. Scott, Combined Nonenzymatic-Enzymatic Method for the Synthesis of Simple Alkyl Fatty Acid Esters from Soapstock, J. Am. Oil Chem. Soc. 73: 1393-1401 (1996).

* cited by examiner

METHOD OF CONVERTING FREE FATTY ACIDS TO FATTY ACID METHYL ESTERS WITH SMALL EXCESS OF METHANOL

CROSS-REFERENCE TO RELATED APPLICATION

This application claims the benefit of U.S. provisional patent application Ser. No. 60/303,656, filed on Jul. 6, 2001, which is herein incorporated by reference in its entirety.

STATEMENT REGARDING FEDERALLY SPONSORED RESEARCH OR DEVELOPMENT

Not applicable.

BACKGROUND OF THE INVENTION

The alkyl monoesters of fatty acids from vegetable oils and animal fats, known as biodiesel, have been proposed as an alternative, non-toxic, biodegradable and renewable diesel fuel. Many studies have shown that the properties of biodiesel are very close to diesel fuel. Therefore, biodiesel fuel can be used in diesel engines with little or no modification. Biodiesel has a higher cetane number than diesel fuel, no aromatics, no sulfur, and contains 10 to 11% oxygen by weight. These characteristics of biodiesel reduce the emission of carbon monoxide, hydrocarbons, and particulate matter in the exhaust gas compared to diesel fuel.

Refined vegetable oils are the main starting materials for producing biodiesel (1,2). Methanol is added into vegetable oils to transesterify triglycerides into fatty acid methyl esters (FAME). Most commonly, a base catalyst such as methoxide is used to catalyze the transesterification reaction. However, refined vegetable oils are expensive. Cheaper starting materials are desirable for reducing the cost of biodiesel products.

One source of cheaper starting material is the soapstock generated during vegetable oil refining process. The soap is of limited value and some soapstock processors acidify it to convert the soap to free fatty acids (FFA) and also to release the entrained neutral oil. The oil layer composed of oil and a high level of FFA, often referred to as acid oil, is usually sold as a feed ingredient. Generally, soapstock is produced at 6% of the volume of crude oil produced (3), accounting for 1.8 billion pounds in the U.S. annually. Therefore, there is great potential to create a value-added biodiesel product from such inexpensive material. Other sources of cheaper starting materials include waste vegetable oils from restaurants and rendered animal fats. Approximately 2.5 billion pounds of waste restaurant fats are collected from restaurants and fast-food establishments in the U.S. As the acid oil from soapstock, the restaurant waste oils and fats also contain high levels of FAA.

The base catalyst-catalyzed transesterification reaction, commonly used for generating FAMEs from refined vegetable oils, cannot be used to produce biodiesel from the cheaper starting materials with high FFA content identified above since the FAAs in the materials form soaps with the base catalyst. One way people have tried to solve the problem was to convert FFAs in acid oil into methyl esters by using a large excess amount of methanol and an acid catalyst followed by the commonly used base catalyst-catalyzed transesterification reaction to convert oil to FAMEs. The large amount of methanol used is for driving the reaction to completion. Due to the large amount of methanol used in this process, methanol must be recycled to reduce the cost. However, the recycling process itself is expensive.

BRIEF SUMMARY OF THE INVENTION

The present invention provides a method of converting FFAs in acid oil or acid fat to FAMEs using a small amount of methanol and an acid catalyst. The small amount of methanol used is able to help drive the esterification reaction to completion. At the end of the reaction, the reaction mixture can be separated into a top lipid phase containing FAMEs, triglycerides and unreacted FAAs and a bottom phase containing excess methanol, acid catalyst, water and glycerol. The bottom phase may contain other impurities in the acid oils and can form a viscous sludge. The top lipid phase can be taken and subjected to conditions for transesterifying triglycerides into FAMEs.

It is an object of the present invention to convert FFAs in acid oils and acid fats to FAMEs.

It is feature of the present invention that a small amount of methanol is used.

It is an advantage of the present invention that the amount of excess methanol at the end of the esterification reaction is very small and thus does not have to be recycled. Accordingly, the method of the present invention is cost-efficient. If large excesses of methanol are used, the methanol must be recovered and dehydrated.

It is another advantage of the present invention that a lipid phase containing the FAMEs, unreacted FFAs and triglycerides can form and be separated from the rest of the reaction mixture easily by phase separation for further processing.

Other objects, advantages, and features of the present invention will become apparent from the following detailed description of the invention.

DETAILED DESCRIPTION OF THE INVENTION

Figure 1:
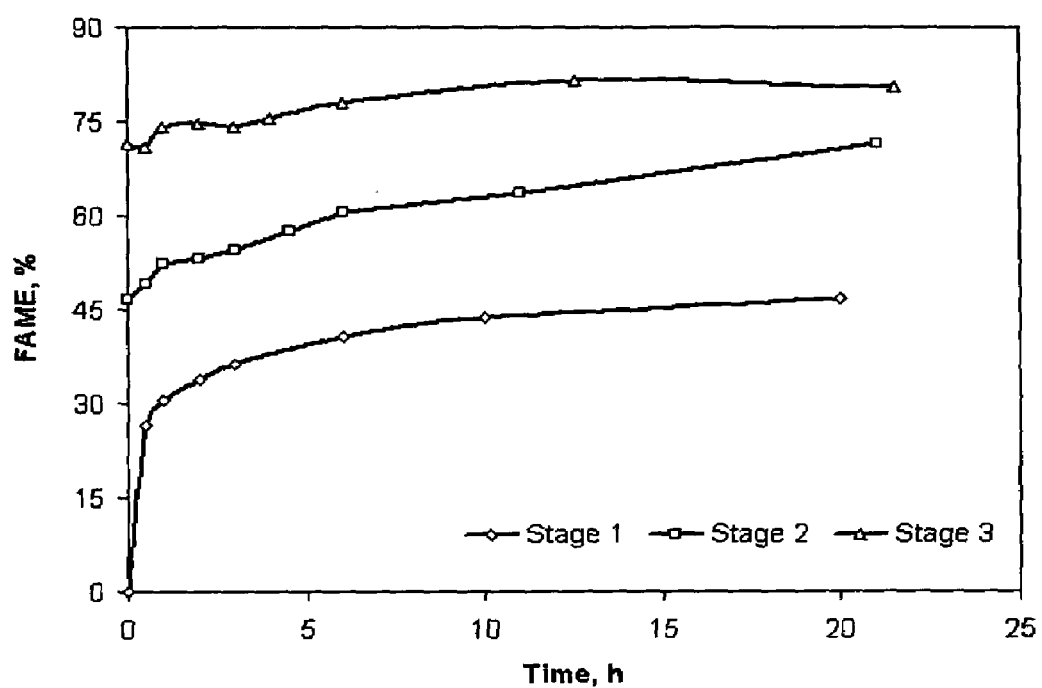
FIG. 1 shows typical three-stage conversion of acid oil to FAME.

The terms "acid oil" and "acid fat" in the specification and claims are used to refer to triglyceride oils and fats that contain relatively high levels of FFAs. The amount of FFAs (acid value) in a sample can be measured by the quantity of a powerful base (such as potassium hydroxide) required to neutralize the sample. The amount of FFAs in vegetable and animal oils and fats can be estimated by dividing the acid value in half, i.e., 1 mg KOH/g is equivalent to about 0.5% FFA. When the amount of FFAs in an acid oil or acid fat is relatively high (above about 1.0%), transesterification reactions for converting triglycerides in the oil or fat to FAMEs with a base catalyst will be impeded. Cheap starting materials for producing biodiesel such as soapstock generated during the vegetable oil refining process and waste vegetable oils and animal fats from restaurants can have an FFA level as high as 30% to 80%. The present invention provides a method for converting the FFAs in acid oil or acid fat into FAMEs. The conversion allows triglyceride oils or fats to be transesterified to FAMEs next. The conversion also increase the efficiency of biodiesel production from the starting material acid oil or acid fat.

The method of the present invention for converting FFAs in acid oil or acid fat to FAMEs involves determining the FAA level in the acid oil or acid fat first. Next, suitable amounts of methanol and an acid catalyst are added into acid oil or acid fat to form a reaction mixture. The reaction mixture is then subjected to conditions suitable for forming FAMEs so that FAMEs form from the FFAs.

Methods of measuring FFA levels in acid oil or acid fat are well known in the art and any of these methods can be used in the present invention. A suitable amount of methanol for the method of the present invention is an amount that is about 100% to about 470% of the theoretical amount needed to convert all FFAs into FAMEs. The theoretical amount of methanol needed to convert all FFAs into FAMEs is defined as an equal number of methanol molecules as that of FAA molecules. In one embodiment, an amount of methanol about 120% to about 300% of the theoretical amount is used in the method of the present invention. In another embodiment, an amount of methanol between 100% and 150% of the theoretical amount is used. In still another embodiment, an amount of methanol about 270% of the theoretical amount is used. The term "about" used for a specific concentration, temperature and period of time in the specification and claims is intended to cover small variations of the specific concentration, temperature and period of time that still retain the functionality of the specific concentration, temperature and period of time.

Suitable acid catalysts for converting FFAs to FAMEs are known in the art. Any of these catalysts can be used in the method of the present invention. Examples of these catalysts include but are not limited to sulfuric acid, hydrogen chloride and p-toluenesulfonic acid. When sulfuric acid is used, an suitable amount is about 0.1% to about 7.5% by weight in the reaction mixture. Preferably, the amount of sulfuric acid used is about 0.6% to about 5.8% or about 1.2%. When other acid catalysts are used, a skilled artisan either knows or can easily determine the suitable amount that can be added into the reaction mixture.

The speed that FFAs are converted to FAMEs in the reaction mixtures described above is a function of the reaction temperature. The higher the reaction temperature, the higher the speed. Preferably, the reaction conditions used by the present invention is at least 20° C., 25° C., 30° C., 35° C., 40° C., or 45° C. with stirring. Most preferably, the reaction temperature is kept at about at least 50° C., 55° C., 60° C. and 65° C. The boiling point of methanol is about 65° C. In a preferred embodiment of the present invention, the reaction mixture is kept at reflux conditions and extra stirring is not necessary in this embodiment because refluxing can serve the stirring function. The reaction time needed to convert a desired percentage of FFAs into FAMEs under specific amounts of methanol, acid catalyst and reaction temperature can readily be determined by a skilled artisan. For example, a small sample of the reaction mixture can be taken at different time points and the FFA level and FAME level can be determined. Generally speaking, the reaction time range goes from about 0.5 h to about 2.0 h, about 3.0h, about 5.0 h or about 10 h.

At the end of the reaction, a lipid phase that contains FAMEs, unreacted FFAs and triglycerides can be separated from the rest of the reaction mixture. One way to separate the lipid phase is to centrifuge the reaction mixture and the lipid phase will form on top of a viscous sludge phase that contains excess unreacted methanol, acid catalyst, water, glycerol and other impurities. Letting the reaction mixture sit for a sufficient period time will also lead to separation of the lipid phase and the viscous sludge phase. The lipid phase is then taken for further processing.

Optionally, the lipid phase can be subjected to another cycle of the reaction described above to further reduce the amount of FFAs in the acid oil or acid fat by converting them into FAMEs. As described in the example below, the second cycle will also transesterify some triglycerides to FAMEs.

Once most of FFAs in the acid oil or acid fat are converted to FAMEs, the triglycerides in the resulted lipid phase can then be converted into FAMEs as well. In the example describe below, the same acid catalyst-catalyzed reaction is used to achieve this. Other transestrification reactions such as one catalyzed by a base catalyst can also be used. These methods are well known in the art.

The invention will be more fully understood upon consideration of the following non-limiting example.

EXAMPLE

Materials and Methods

Soapstock sources. Twelve separate batches of acid oil generated from soybean soapstock were collected within a month period, representing various oil refining plants (ADM, Cargill, or a mixture of the two sources) and from different settling process (regularly settled or settled from the emulsion layer/tank). Moisture and FFA contents of the acid oils were measured using the standard methods (Ca 2c–25 and Ca 5a–40 of American Oil Chemists Society, for moisture and FFA, respectively) (7).

Soapstock acidulation. A batch acidification system at Feed Energy Company (Des Moines, Iowa) was used to obtain the acid oil. Crude soapstock was pumped in the reactor, and it was heated to 85–88° C. with steam for 2–4 hrs. An excess amount of sulfuric acid (10–15% above the theoretical amount, based on the FFA content) was used for the reaction. The mixture was allowed to settle, the oil layer was pumped out, the water layer was drained, and the emulsion layer was either mixed with a new batch of soap stock and acidified again or was kept for a long time for continuing settling. This process is similar to one described by Woerfel (8), which is herein incorporated by reference in its entirety.

Three-stage methyl ester conversion. For a typical reaction, about 200 gram of acid oil was used. A molar ratio of free and potential fatty acids in acid oil:methanol:concentrated sulfuric acid of 1:1.3:0.03 was used for conversion to FAME. The mixture was refluxed continuously for about 25 hours, and 0.5 ml samples were taken periodically for FAME quantification. After the first stage reaction, the mixture was centrifuged, and a viscous bottom sludge phase containing excess methanol, acid catalyst, water, and glycerol was removed. The supernatant lipid phase was weighed and methanol and acid were added. The quantities of methanol and acid were based on the calculated amount of the non-methyl ester fraction using the same ratio used in the first stage reaction. Samples were again taken during the course of reaction for FAME quantification. After an additional 24 h, the lower phase was removed, and methanol and acid were added for a third stage reaction.

To test the effects of methanol and sulfuric acid concentrations on FAME conversion, five methanol concentration levels, 110, 130, 150, 200, 300% of the theoretical molar requirements were tested at catalyst concentration of 1.2% of the weight of acid oil used. To test the effect of catalyst concentration, four levels of sulfuric acid, 0.6, 1.2, 2.4, and 5.8% by weight of the acid oil were used at a molar ratio of methanol:acid oil of 1.3:1.

Gas chromatographic (GC) quantification of FAME. The samples taken from the reaction mixture were centrifuged at 1,000×g for 5 min to obtain a clear lipid supernatant. The lipid phase was freed of methanol under a nitrogen stream and two drops of sample were weighed and mixed with an aliquot of internal standard (methyl heptadecanate) solution of known concentration. The GC system used for FAME quantification was a Hewlett-Packard (HP) (Avondale, Pa.) 5890A with a flame ionization detector and capillary DB-23 (15-m length, 0.25-mm id., and 0.25-mm film thickness) fused column from J & W Scientific (Deerfield, Ill.). Oven temperature was 220° C., inlet and detector temperature were 250° C.; split ratio was 10:1.

Other analytical methods used in characterizing unknown substances. Thin layer chromatography, as described in Christie (9) (incorporated by reference in its entirety), was used to separate and characterize the reaction mixture. Viscosity of lipid material was determined at ambient temperature using a Brookfield DV-II+viscometer (Stoughton, Mass.). The standard operating procedure was followed. To separate lipid components of the reaction mixture, a falling film molecular still distillation system of Kimble and Kontes (Vineland, N.J.) was used. 1,3,5- trimethyl benzene was as a heating media because of its boiling temperature, which was similar to that of FAMEs under 1 Torr. To examine the possibility of polymer formation from the acid oil we used, a reaction was conducted using the condition described in Isbell et al (10). About 100 grams of an acid oil was mixed with 5% sulfuric acid, and the mixture was heated and stirred at 55° C. in a rotary evaporator for 50 h. Viscosity was then measured.

Results

FAME conversion in a three-stage reaction. Typical curves of a three-stage reaction are shown in FIG. 1. The reaction proceeded rapidly during the first hour of reaction, and then slowed considerably. The second and third stages, in contrast, showed a rather gradual increase in FAME over time. Table 1 shows data from the three-stage conversion of the 12 oil samples with various initial FFA and moisture contents. It also presents the FFA contents of selected samples at the end of each stage. The first stage reaction converted most of the FFA to ester, and after the second stage reaction, there was little further reduction in FFA. When FFA reacts with methanol, water is produced, and it can limit the extent of reaction. Separation of the lipid and aqueous phases after each stage of reaction allows the removal of the water and glycerol that is released when the FFAs and triglycerides are respectively reacted. Thus, the reaction could be driven toward completion.

TABLE 1

Free fatty acid contents of initial acid oils and after each esterification reaction, and the maximum FAME conversion after each stage of reaction[a]

| Sample ID | Initial FFA (%) | Initial moisture (%) | Max. FAME conversion after each stage of reaction (%) | | | FFA after each stage of reaction (%)[c] | | |
|---|---|---|---|---|---|---|---|---|
| | | | 1 | 2 | 3 | 1 | 2 | 3 |
| 1 | 50.6 | 2.60 | 47.3 | 68.8 | 78.3 | — | — | 2.5 |
| 2 | 51.2 | 1.65 | 47.3 | 67.3 | 79.3 | — | — | 2.9 |
| 3 | 53.4 | 1.65 | 50.0 | 70.6 | 82.2 | — | — | 1.1 |
| 4 | 50.4 | 4.09 | 47.2 | 70.8 | 78.9 | — | — | 1.3 |
| 5 | 55.6 | 5.26 | 40.4[b] | 63.6 | 84.9 | 16.8 | 2.3 | 1.5 |
| 6 | 45.1 | 1.10 | 46.5 | 71.4 | 80.4 | 2.9 | 1.2 | 1.2 |
| 7 | 44.8 | 1.10 | 45.4 | 67.2 | 80.3 | 4.2 | 1.5 | 2.5 |
| 8 | 43.0 | 0.78 | 46.9 | 73.9 | 79.1 | 5.56 | 1.5 | 1.1 |
| 9 | 56.8 | 6.84 | 53.1 | 70.5 | 83.7 | — | — | 2.0 |
| 10 | 48.4 | 2.19 | 48.6 | 67.7 | 78.3 | — | — | 7.9 |
| 11 | 56.4 | 6.14 | 51.6 | 73.1 | 80.9 | 9.13 | 2.2 | 1.6 |
| 12 | 71.7 | 1.95 | 60.2 | 72.6 | 84.3 | 10.6 | 3.0 | 3.0 |

[a]All reaction were between 21–25 hours.
[b]Treated as outlier in data analysis.
[c]— indicates sample not analyzed for FFA content.

The maximum FAME conversion obtained for all 12 acid oils averaged 81%. Freeman et al (11) reported that lipid esterification reaction by acid catalysis was much slower than that by base catalysis, and the methanol to oil ratio used in base catalysis would not give a satisfactory FAME conversion when acid catalyst was used (12).

The FFA content of acid oil affected FAME conversion in the first stage reaction. The more FFA an oil had, the higher the percentage of FAME the first stage product contained ($R^2=0.9184$, $P<0.0001$), and the relationship is shown in Equation [1].

$$\text{FAME \%} = 0.5125 \times \% \text{ FFA} + 22.824 \quad [1]$$

Figure 2:
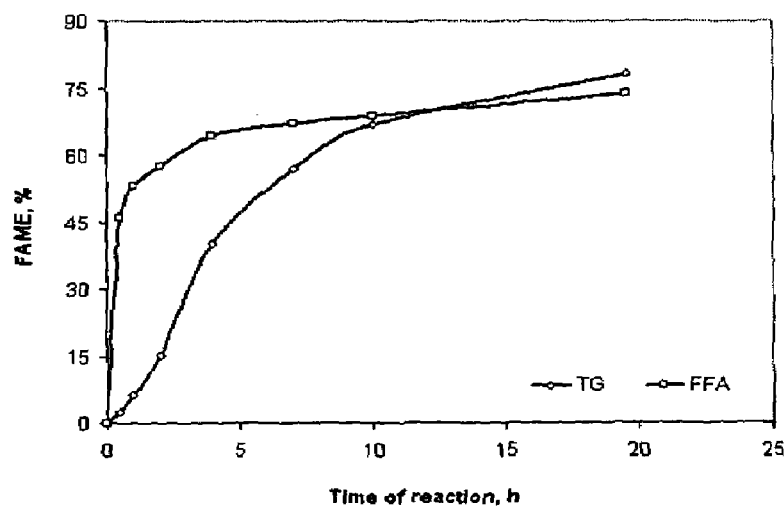
FIG. 2 shows esterification of pure soybean FFA and triglyceride (TG) under the reaction conditions used for acid oils (refluxing with 0.52% sulfuric acid and 130% methanol).

Model fitting for first stage reactions. Attempts to use chemical kinetics models, such as zero, first, and second order to fit the data were unsuccessful, possibly because the two components (FFAs and triacylglycerols) had different reaction kinetics. FFAs had a faster reaction rate compared to neutral oil. A model system, in which pure FFA and triglyceride were used separately in two reactions under the same condition as used for all other oils, demonstrated the difference in reaction kinetics for the two substrates (FIG. 2). The miscibility of neutral oil with methanol, in which the catalyst is concentrated and the reaction takes place, is low, thus a slow reaction occurs. FFA has better miscibility in methanol compared to neutral oil, and the reaction goes faster. This effect of miscibility of the lipid and catalyst in alcohol on transesterification by methanolysis (a two-phase reaction) and butanolysis (a single-phase reaction) showed that the latter was faster (1). An extended Freundlich model, which is often used as a three-parameter nonlinear regression model to fit various types of data (13), proved to be the best for our data. The model relates the percentage of FAME with time of reaction, $$Yi = f(ti, \beta) \quad [2]$$

Where $Y_i$ is percent FAME at time $t=i$ hour. The response function $f(t_i, \beta)$ is taken as the extended Freunlich model, and it is given the following parametric form:

$$f(t_i, \beta) = \beta_0 t_i^{\beta_1} t_i^{-\beta_2} \quad [3]$$

Parameters to be estimated are thus $\beta_0$, $\beta_1$, and $\beta_2$, and estimation is generated by using SAS (14) nonlinear model procedure.

The characteristics of the Freundlich model are as follow:
1. $f(0, \beta)=0$ for any $\beta$, meaning when time is zero, the FAME percentage is zero.
2. $f(1, \beta)=\beta_0$. This parameter represents a rate of initial increase in FAME percentage, which is the FAME percentage value after the first hour of reaction.
3. If $\beta_0>0$ and $\beta_1>0$, $f(ti, \beta)$ has a maximum which occurs at $ti=\exp(1/\beta_2)$. The value of the maximum is $\beta_0 \exp(1/\beta_2)^{0.3679\beta_1}$
4. An increase in $\beta_0$ or $\beta_1$ increases the maximum FAME conversion, while a decrease in $\beta_2$ increases maximum conversion. Essentially, $\beta_1$ is a measure of the curvature of the curve. The higher the value, the smaller the curvature, therefore the curve goes up faster. $\beta_{12}$ is a parameter that fine-tunes the curve, making it raise or depress toward the end. The higher the value, the more depressed is the curve.

This model resulted in one set of $\beta$ values for each batch of acid oil, as shown in Table 2. All the $\beta$ parameters significantly improved the data fit. For the 12 first-stage reactions of oils with varied FFA contents, $\beta_0$ values showed significant correlation ($R^2=0.4379$, P= 0.027) with FFA contents as shown in Equation [4], whereas, $\beta_1$ and 62 $_2$ values did not.

$$\beta_0 = 0.234 \times \% \text{ FFA} + 16.750 \quad [4]$$

that of first stage. This suggests that the rate of first stage reaction may be also affected by other unknown factors. The $\beta_1$ and $\beta_2$ values did not show significant differences among the oil samples tested.

To generalize the three-stage reaction with the nonlinear model, the following equations may be used to predict the reactions if the same catalyst and methanol concentrations as used in this experiment are used. The mean $\beta$ values were used in the following equations.

Stage 1: % FAME=$\beta_0 t^{0.243 t^{-0.120}}$

Stage 2: % FAME=$\beta_0 t^{0.058 t^{0.117}}$

Stage 3: % FAME=$73.17 t^{0.022 t^{-0.062}}$

The $\beta_0$ values for stage 1 and stage 2 reactions could be obtained based on the FFA content of an acid oil sample, using the relationships shown in Equations [4] and [5].

The three-parameter extended Freundlich model was successfully used to describe the esterification reaction of our multi-component system. The purpose of this model fitting or parameterization was not to interpret the mechanism of chemical reactions, but rather to generalize the data and to be able to predict the reaction outcome under certain conditions. Such modeling of chemical reactions or other physical or biological phenomena was often used without complete understanding of the underlining principles (13).

TABLE 2

Parameters derived from extended Freundlich model for the three-stage esterification reactions of acid oils with various fatty acid compositions

| Acid oil | 1st stage reaction | | | 2nd stage reaction | | | 3rd stage reaction | | |
|---|---|---|---|---|---|---|---|---|---|
| | $\beta_0$ | $\beta_1$ | $\beta_2$ | $\beta_0$ | $\beta_1$ | $\beta_2$ | $\beta_0$ | $\beta_1$ | $\beta_2$ |
| 1 | 26.163 | 0.286 | 0.123 | 54.864 | 0.052 | −0.102 | 73.216 | 0.000 | −1.289* |
| 2 | 31.117 | 0.199 | 0.122 | 55.043 | 0.034 | −0.216 | 75.878 | 0.018 | −0.054 |
| 3 | 30.697 | 0.251 | 0.150 | 57.528 | 0.032 | −0.256 | 69.949 | −0.091* | 0.354 |
| 4 | 26.537 | 0.263 | 0.113 | 56.198 | 0.081 | 0.037 | 72.556 | 0.033 | 0.068 |
| 5 | 15.467* | 0.353* | 0.033* | 53.698* | 0.060* | 0.024* | 65.898* | 0.036* | −0.264* |
| 6 | 31.032 | 0.234 | 0.181 | 51.281 | 0.055 | −0.221 | 72.869 | 0.032 | −0.038 |
| 7 | 27.725 | 0.240 | 0.134 | 50.498 | 0.062 | −0.144 | 74.626 | 0.026 | 0.038 |
| 8 | 25.859 | 0.277 | 0.110 | 53.674 | 0.074 | −0.121 | 73.646 | 0.023 | 0.022 |
| 9 | 30.314 | 0.240 | 0.085 | 57.993 | 0.064 | −0.012 | 71.987 | 0.011 | −0.499 |
| 10 | 27.247 | 0.199 | 0.030 | 53.930 | 0.072 | −0.017 | 73.779 | 0.031 | 0.605 |
| 11 | 26.859 | 0.297 | 0.111 | 58.844 | 0.046 | −0.141 | 72.926 | 0.020 | −0.152 |
| 12 | 34.721 | 0.298 | 0.165 | 64.952 | 0.038 | 0.033 | 79.427 | 0.039 | 0.220 |
| Mean | 28.521 | 0.243 | 0.120 | 54.556 | 0.058 | −0.117 | 73.167 | 0.022 | 0.062 |
| Std Dev | 2.231 | 0.031 | 0.040 | 2.550 | 0.017 | 0.103 | 1.669 | 0.012 | 0.321 |

*Values treated as outliers.

The significant effect of FFA on the FAME percentage of the first stage reaction may be largely due to the rapid initial FAME formation.

The second and third stage reactions were fitted with the extended Freundlich model as well. The parameter estimates showed consistent differences from those of the first stage reactions. In particular, values of $\beta_1$ are smaller and those of $\beta_2$ tend to be negative. Values for $\beta_0$ are greater than those of stage 1 reactions because these two subsequent stages are cumulative over the first stage results. The second stage $\beta_0$ values correlated with initial FFA contents ($R^2= 0.9166$, P<0.0001), as shown in Equation [5]:

$$\beta_0 = 0.480 \times \% \text{ FFA} + 30.981 \quad [5]$$

Figure 3:
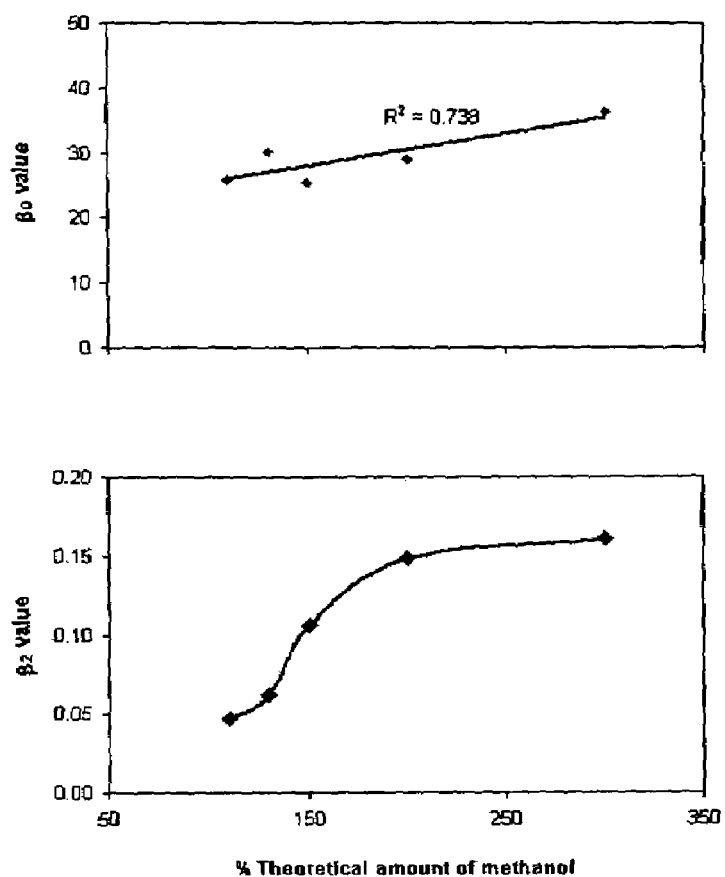
FIG. 3 shows effect of methanol on the Freundlich model parameter estimates.

$\beta_0$ values of the third stage were no longer correlated with the FFA contents ($R^2= 0.2507$, P=0.117) since the FFA was almost all converted at this stage. The second stage $\beta_0$ regression on FFA % showed a stronger relationship than Effect of methanol on FAME conversion. Five methanol concentrations were tested to examine their effect on FAME conversion in the first stage reaction. Correlations of the Freundlich parameter estimates, $\beta_0$, $\beta_1$, and $\beta_2$, with methanol concentration were calculated and those for $\beta_0$ and $\beta_2$ are shown in FIG. 3. The values of $\beta_0$ correlated positively but not statistically significantly (at 5%) with methanol concentration ($R^2=0.738$, P=0.062). $\beta_1$ values showed a trend of opposite change with methanol although the correlation was not statistically significant at 5% (data not shown). $\beta_2$ values showed an increase between 110 and 200% methanol amounts, but plateaued at higher methanol concentration. These relationships suggest that as higher amount of methanol is used, the initial reaction tends to go faster, but the reaction curve may become flatter sooner.

Figure 4:
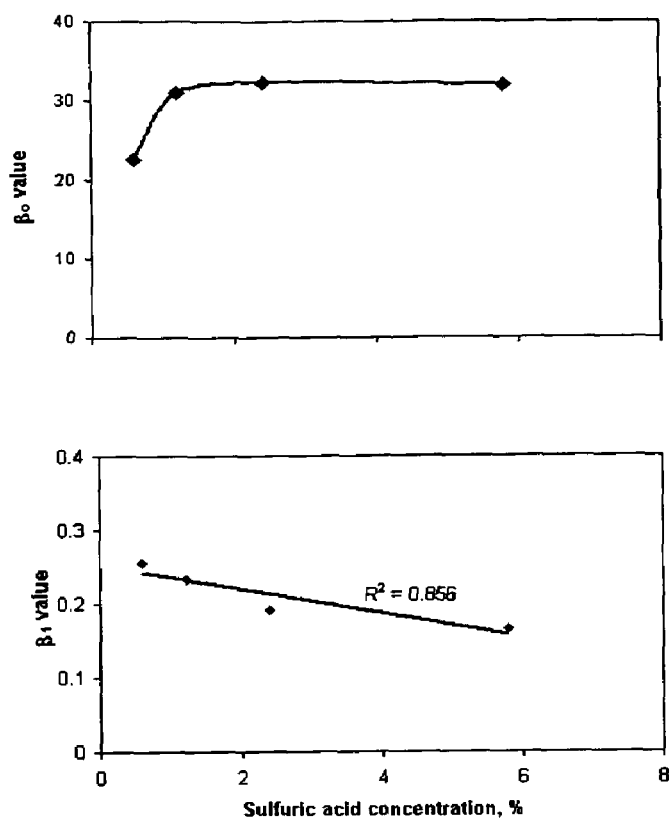
FIG. 4 shows effect of sulfuric acid on the Freundlich model parameter estimates.

Effect of sulfuric acid on FAME conversion. Four sulfuric acid concentrations were tested in the first reaction stage, and as for methanol treatment, correlations of the Freundlich parameter estimates, $\beta_0$, $\beta_1$, and $\beta_2$ with sulfuric acid concentration were calculated and the results for $\beta_0$ and $\beta_1$ are shown in FIG. 4. The initial reaction rate ($\beta_0$) increased with catalyst concentration up to about 1.2%, but above this concentration the initial reaction rate was not affected. $\beta_1$ values were negatively correlated to acid concentration ($R^2$=0.856, P=0.075), and $\beta_2$ values did not show an obvious pattern of change (data not shown). These relationships indicate that sulfuric acid concentration higher than 1.2% may not be beneficial for the esterification reactions under the conditions of this experiment.

Other researchers have shown that use of large quantity of methanol gives more complete reaction. Using molar ratio of 1:30:5 for soapstock, methanol, and sulfuric acid catalyst, a very high FAME conversion (99%) could be obtained from totally saponified fatty material (4). It was also suggested that the minimum effective molar ratio of alcohol to lipid-linked fatty acids was 20:1 in an esterification reaction, in which dried soapstock was esterified under base-catalyzed reaction conditions (5). Basu and Norris' calcium and barium acetate catalyzed one-stage esterification of acid oil (6), with three times of the theoretical amount of methanol, 0.5% catalyst, at 220° C. for 3 h, resulted in 82% FAME recovery.

Unknown materials present in acid oil and FAME. Two unidentified substances were found: one settled as a sludge after the first stage esterification reaction and the other was found in the ester phase after the final stage of reaction. The sludge was a hydrophilic, gel-forming material, which apparently was not partitioned into the water layer during the acidification of soap stock. When crude acid oil (diluted in hexane at about 1:1 ratio) was washed with water, the lower water layer formed a firm gel after centrifugation. After repeated washing of this material with hexane, the residual material was quantified as 10.8% (by weight) of the acid oil. Soap contains many non-lipid materials that are co-extracted from the soybean seed (7), particularly, if it is obtained from an oil that was not water degummed. Haas and Scott (5) reported that their moisture-free soap stock contained 18.2% FFAs, 18.3% triglycerides, 3.3% diglycerides, 15.5% phospholipids, 25.5% solvent-insolubles, and 19.1% other materials that were solvent soluble but not characterized. Soap acidulation and water removal by phase separation may have only removed some of this uncharacterized hydrophilic material in our acid oil samples.

The second unidentified substance was hydrophobic and dissolved in the ester phase. The percentage of FAME in the ester phase could not be increased above 85%, even after a fourth-stage reaction was conducted, or if a 12-times of the theoretical amount of methanol was used for a fourth stage reaction, or if a base catalyst, sodium methoxide, was used in large excess. In order to identify this unconvertible lipid material, preparative thin layer chromatography was used to separate various lipid components in an ester sample (with 80.4% FAME content). No significant amount of unknown lipid band or fraction was observed, although small quantities of sterols, hydrocarbons, and FFA may partially account for the none-FAME component in the product.

We hypothesized that the unknown was a polymer. Viscosity of the ester converted from acid oil was higher (4.65 cp) than the one commercially produced from refined oil (3.69 cp), indicating high molecular-weight material may indeed be present. A lab scale molecular still was used to purify the ester. An ester feed with 80% FAME yielded two fractions. The distillate accounted for 75% of the total weight and contained 90% FAME, and the residual fraction of 25% had 39% FAME. This result showed that the vapor pressure of this unknown material was lower than FAME but was not low enough to allow a good separation from the FAME.

Polymers of FFA, such as oleic acid, can be synthesized under acidic conditions (10, 15). Such polymers are unique oligomeric fatty acids that contain an ester linkage on the alkyl backbone of the fatty acid. To examine the possibility of polymer formation from the acid oil we used, a test was conducted using the condition described in Isbell et al (10), which is incorporated by reference in its entirety. A viscous material was formed, which has viscosity of 59,087 cp, compared to 57 cp of the acid oil sample before reaction. Such observation suggests formation of polymer. This possible polymeric fatty acid esters may have been formed during the soap acidulation process, or during the esterification reaction, due to the limited supply of methanol substrate and the long reaction time. We noticed decreases of FAME percentage in three out of the 12 third-stage reactions, possibly due to the cross link between the unreacted FFA and the double bonds of the FAME molecules. In practice, a much shorter reaction time could be used because there was little gain after 5–10 h of reflux (FIG. 1). If 30 times of the theoretical amount of methanol was used, as in Haas' (4) reaction, the FAME conversion may have been very fast and complete, and formation of any polymer during this reaction might have been minimized.

The present invention is not intended to be limited to the foregoing example, but encompasses all such modifications and variations as come within the scope of the appended claims.

REFERENCES

1. Boocock, D. G. B., S. K. Konar, V. M. C. Lee, and S. Buligan, Fast Formation of High-Purity Methyl Esters from Vegetable Oils, J. Am. Oil Chem. Soc. 75: 1167–1172 (1998).
2. Stern, R., G. Hillion, P. Gateau, and J. C. Guibet, Preparation of Methyl and Ethyl Esters from Crude vegetable Oils and Soap Stock, Proceeding: World Conference on Emerging Technologies in the Fats and Oils Industry, edited by A. R. Baldwin, American Oil Chemists' Society, Champaign, 1986, pp. 420–422.
3. Anonymous, 2000 Soya & Oilseed Bluebook, Soytech, Inc., Bar Harber, 2000, p. 386.
4. Haas, M. J., S. Bloomer, and K. Scott, Simple, High-Efficiency Synthesis of Fatty Acid Methy Esters from Soapstock, J. Am. Oil Chem. Soc. 77: 373–379 (2000).
5. Haas, M. J. and K. M. Scott, Combined Nonenzymatic-Enzymatic Method for the Synthesis of Simple Alkyl Fatty Acid Esters from Soapstock, J. Am. Oil Chem. Soc. 73: 1393–1401 (1996).
6. Basu, H. N. and M. E. Norris, Process for Production of Esters for Use as a Diesel Fuel Substitute Using a Non-Alkaline Catalyst, U.S. Pat. No. 5,525,126 (1996).
7. Official Methods and Recommended Practices of the American Oil Chemists' Society, 4th edition, AOCS Press, Champaign, Ill. (1994).
8. Woerfel, J. B., Alternatives for Processing of Soapstock, J. Am. Oil Chem. Soc. 60: 310–313 (1983).
9. Christie, W. W., The Analysis of Simple Lipid Classes, in Lipid Analysis, 2nd edition, Pergamon Press, New York, 1982, pp. 93–106.
10. Isbell, T. A., H. B. Frykman, T. P. Abbott, J. E. Lohr, and J. C. Drozd, Optimization of the Sulfuric Acid-Catalyzed Estolide Synthesis from Oleic Acid, J. Am. Oil Chem. Soc. 74: 473–476 (1997).

11. Freeman, B., E. H. Pryde, and T. L. Mounts, Variables Affecting the Yields of Fatty Esters from Transesterified Vegetable Oils, J. Am. Oil Chem. Soc. 61: 1638–1643 (1984).

12. Freeman, B., R. O. Butterfield, and E. H. Pryde, Transesterification Kinetics of Soybean Oil, J. Am. Oil Chem. Soc. 63: 1375–1380 (1986).

13. Ratkowsky, D. A., Models with One X Variable, Convex/Concave Curves, in Handbook of Nonlinear Regression Models, edi. D. A. Ratkowsky, Maecel Dekker, Inc. New York and Basel, pp75–121, (1990).

14. SAS System for Windows, V8, SAS Institute Inc., Cary, N.C. 1999–2000.

15. Isbell, T. A., R. Kleiman, and B. A. Plattner, Acid-Catalyzed Condensation of Oleic Acid into Estolides and Polyestolides, J. Am. Oil Chem. Soc. 71: 169–174 (1994).

We claim:

1. A method for converting free fatty acids in acid oil or acid fat to fatty acid methyl esters comprising the steps of:
   determining the free fatty acid level in the acid oil or acid fat;
   adding methanol into the acid oil or oil fat in an amount about 100% to about 470% of the theoretical amount needed to convert all free fatty acids in the acid oil or acid fat into methyl esters;
   adding an acid catalyst for esterification reaction into the acid oil or acid fat; and
   subjecting mixture of acid oil or acid fat, methanol and the catalyst to conditions suitable for forming fatty acid methyl esters so that fatty acids methyl esters form from the free fatty acids, wherein, after performing the subjecting step, any glycerol in the mixture was formed in the method.

2. The method of claim 1, wherein the methanol added into the acid oil or acid fat is about 120% to about 300% of the theoretical amount needed to convert all free fatty acids in the acid oil or acid fat into methyl esters.

3. The method of claim 1, wherein the methanol added into the acid oil or acid fat is about 270% of the theoretical amount needed to convert all free fatty acids in the acid oil or acid fat into methyl esters.

4. The method of claim 1, wherein the methanol added into the acid oil or acid fat is between 100% and 150% of the theoretical amount needed to convert all free fatty acids in the acid oil or acid fat into methyl esters.

5. The method of claim 1, wherein the catalyst is selected from sulfuric acid, hydrogen chloride and p-toluenesulfonic acid.

6. The method of claim 1, wherein the catalyst is sulfuric acid.

7. The method of claim 1, wherein the conditions suitable for forming fatty acid methyl esters are reflux reaction conditions.

8. A method for preparing acid oil or acid fat for transesterification reactions to convert triglycerides to fatty acid methyl esters, the method comprising the steps of:
   determining the free fatty acid level in the acid oil or acid fat;
   adding methanol into the acid oil or oil fat in an amount about 100% to about 470% of the theoretical amount needed to convert all free fatty acids in the acid oil or acid fat into methyl esters;
   adding an acid catalyst for esterification reaction into the acid oil or acid fat;
   subjecting mixture of acid oil or acid fat, methanol and the catalyst to conditions suitable for forming fatty acid methyl esters so that fatty acids methyl esters form from the free fatty acids, wherein, after performing the subjecting step, any glycerol in the mixture was formed in the method;
   subjecting the mixture containing fatty acid methyl esters to conditions suitable for forming a separate lipid phase from the rest of the mixture wherein the lipid phase contains oil or fat and fatty acid methyl esters; and
   recovering the lipid phase.

9. The method of claim 8, wherein the methanol added into the acid oil or acid fat is about 120% to about 300% of the theoretical amount needed to convert all free fatty acids in the acid oil or acid fat into methyl esters.

10. The method of claim 8, wherein the methanol added into the acid oil or acid fat is about 270% of the theoretical amount needed to convert all free fatty acids in the acid oil or acid fat into methyl esters.

11. The method of claim 8, wherein the methanol added into the acid oil or acid fat is between 100% and 150% of the theoretical amount needed to convert all free fatty acids in the acid oil or acid fat into methyl esters.

12. The method of claim 8, wherein the catalyst is selected from sulfuric acid, hydrogen chloride and p-toluenesulfonic acid.

13. The method of claim 8, wherein the catalyst is sulfuric acid.

14. The method of claim 8, wherein the conditions suitable for forming fatty acid methyl esters are reflux reaction conditions.

15. A method for producing fatty acid methyl esters from acid oil or acid fat comprising the steps of:
   determining the free fatty acid level in the acid oil or acid fat;
   adding methanol into the acid oil or oil fat in an amount about 100% to about 470% of the theoretical amount needed to convert all free fatty acids in the acid oil or acid fat into methyl esters;
   adding an acid catalyst for esterification reaction into the acid oil or acid fat;
   subjecting mixture of acid oil or acid fat, methanol and the catalyst to conditions suitable for forming fatty acid methyl esters so that fatty acids methyl esters form from the free fatty acids, wherein, after performing the subjecting step, any glycerol in the mixture was formed in the method;
   subjecting the mixture containing fatty acid methyl esters to conditions suitable for forming a separate lipid phase from the rest of the mixture wherein the lipid phase contains oil or fat and fatty acid methyl esters;
   recovering the lipid phase; and
   converting triglycerides in the lipid phase to fatty acid methyl esters.

16. The method of claim 15, wherein the methanol added into the acid oil or acid fat is about 120% to about 300% of the theoretical amount needed to convert all free fatty acids in the acid oil or acid fat into methyl esters.

17. The method of claim 15, wherein the methanol added into the acid oil or acid fat is about 270% of the theoretical amount needed to convert all free fatty acids in the acid oil or acid fat into methyl esters.

18. The method of claim 15, wherein the methanol added into the acid oil or acid fat is between 100% and 150% of the theoretical amount needed to convert all free fatty acids in the acid oil or acid fat into methyl esters.

19. The method of claim 15, wherein the catalyst is selected from sulfuric acid, hydrogen chloride and p-toluenesulfonic acid.

20. The method of claim 15, wherein the catalyst is sulfuric acid.

21. The method of claim 15, wherein the conditions suitable for forming fatty acid methyl esters are reflux reaction conditions.

22. The method of claim 15, wherein the triglycerides in the lipid phase are converted to fatty acid methyl esters using an acid catalyst.

23. The method of claim 15, wherein the triglycerides in the lipid phase are converted to fatty acid methyl esters using a base catalyst.

24. A method for converting free fatty acids in acid oil or acid fat to fatty acid methyl esters consisting essentially of the steps of:
- determining the free fatty acid level in the acid oil or acid fat;
- adding methanol into the acid oil or oil fat in an amount about 100% to about 470% of the theoretical amount needed to convert all free fatty acids in the acid oil or acid fat into methyl esters;
- adding an acid catalyst for esterification reaction into the acid oil or acid fat; and
- subjecting the mixture of acid oil or acid fat, methanol and the catalyst to conditions suitable for forming fatty acid methyl esters so that fatty acids methyl esters form from the free fatty acids.

25. The method of claim 24, wherein the methanol added into the acid oil or acid fat is about 120% to about 300% of the theoretical amount needed to convert all free fatty acids in the acid oil or acid fat into methyl esters.

26. The method of claim 24, wherein the methanol added into the acid oil or acid fat is about 270% of the theoretical amount needed to convert all free fatty acids in the acid oil or acid fat into methyl esters.

27. The method of claim 24, wherein the methanol added into the acid oil or acid fat is between 100% and 150% of the theoretical amount needed to convert all free fatty acids in the acid oil or acid fat into methyl esters.

28. The method of claim 24, wherein the catalyst is selected from sulfuric acid, hydrogen chloride and p-toluenesulfonic acid.

29. The method of claim 24, wherein the catalyst is sulfuric acid.

30. The method of claim 24, wherein the conditions suitable for forming fatty acid methyl esters are reflux reaction conditions.

31. A method for preparing acid oil or acid fat for transesterification reactions to convert triglycerides to fatty acid methyl esters, the method consisting essentially of the steps of:
- determining the free fatty acid level in the acid oil or acid fat;
- adding methanol into the acid oil or oil fat in an amount about 100% to about 470% of the theoretical amount needed to convert all free fatty acids in the acid oil or acid fat into methyl esters;
- adding an acid catalyst for esterification reaction into the acid oil or acid fat;
- subjecting the mixture of acid oil or acid fat, methanol and the catalyst to conditions suitable for forming fatty acid methyl esters so that fatty acids methyl esters form from the free fatty acids;
- subjecting the mixture containing fatty acid methyl esters to conditions suitable for forming a separate lipid phase from the rest of the mixture wherein the lipid phase contains oil or fat and fatty acid methyl esters; and
- recovering the lipid phase.

32. The method of claim 31, wherein the methanol added into the acid oil or acid fat is about 120% to about 300% of the theoretical amount needed to convert all free fatty acids in the acid oil or acid fat into methyl esters.

33. The method of claim 31, wherein the methanol added into the acid oil or acid fat is about 270% of the theoretical amount needed to convert all free fatty acids in the acid oil or acid fat into methyl esters.

34. The method of claim 31, wherein the methanol added into the acid oil or acid fat is between 100% and 150% of the theoretical amount needed to convert all free fatty acids in the acid oil or acid fat into methyl esters.

35. The method of claim 31, wherein the catalyst is selected from sulfuric acid, hydrogen chloride and p-toluenesulfonic acid.

36. The method of claim 31, wherein the catalyst is sulfuric acid.

37. The method of claim 31, wherein the conditions suitable for forming fatty acid methyl esters are reflux reaction conditions.

38. A method for producing fatty acid methyl esters from acid oil or acid fat consisting essentially of the steps of:
- determining the free fatty acid level in the acid oil or acid fat;
- adding methanol into the acid oil or oil fat in an amount about 100% to about 470% of the theoretical amount needed to convert all free fatty acids in the acid oil or acid fat into methyl esters;
- adding an acid catalyst for esterification reaction into the acid oil or acid fat;
- subjecting the mixture of acid oil or acid fat, methanol and the catalyst to conditions suitable for forming fatty acid methyl esters so that fatty acids methyl esters form from the free fatty acids;
- subjecting the mixture containing fatty acid methyl esters to conditions suitable for forming a separate lipid phase from the rest of the mixture wherein the lipid phase contains oil or fat and fatty acid methyl esters;
- recovering the lipid phase; and
- converting triglycerides in the lipid phase to fatty acid methyl esters.

39. The method of claim 38, wherein the methanol added into the acid oil or acid fat is about 120% to about 300% of the theoretical amount needed to convert all free fatty acids in the acid oil or acid fat into methyl esters.

40. The method of claim 38, wherein the methanol added into the acid oil or acid fat is about 270% of the theoretical amount needed to convert all free fatty acids in the acid oil or acid fat into methyl esters.

41. The method of claim 38, wherein the methanol added into the acid oil or acid fat is between 100% and 150% of the theoretical amount needed to convert all free fatty acids in the acid oil or acid fat into methyl esters.

42. The method of claim 38, wherein the catalyst is selected from sulfuric acid, hydrogen chloride and p-toluenesulfonic acid.

43. The method of claim 38, wherein the catalyst is sulfuric acid.

44. The method of claim 38, wherein the conditions suitable for forming fatty acid methyl esters are reflux reaction conditions.

45. The method of claim 38, wherein the triglycerides in the lipid phase are converted to fatty acid methyl esters using an acid catalyst.

46. The method of claim 38, wherein the triglycerides in the lipid phase are converted to fatty acid methyl esters using a base catalyst.

* * * * *